March 17, 1942.    V. J. CHAPMAN    2,276,825
ADJUSTABLE NOZZLE EXTENSION FOR ARC WELDING HEADS
Filed Oct. 16, 1941
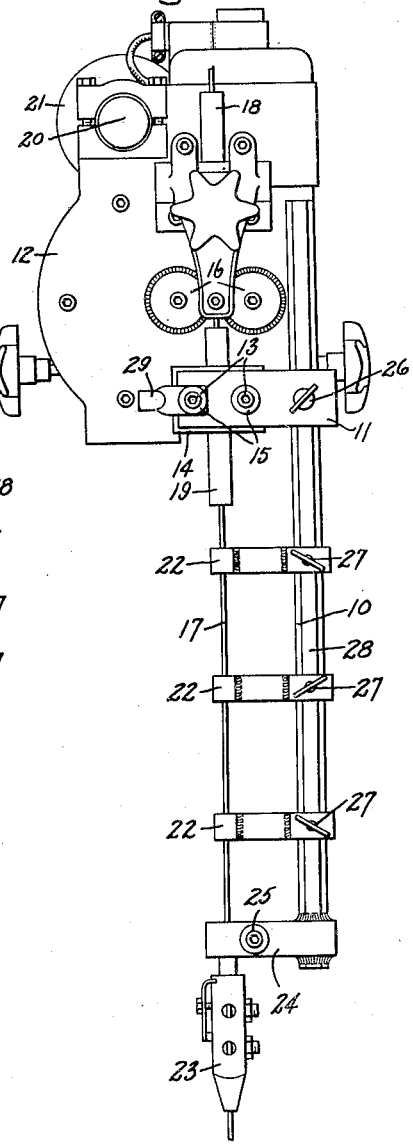
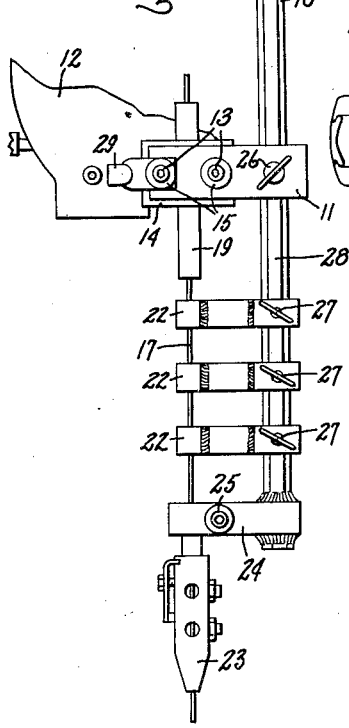
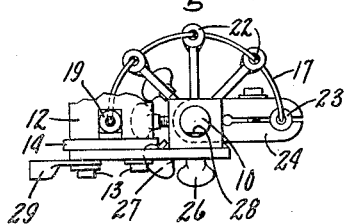
Inventor:
Verni J. Chapman,
by Harry E. Dunham
His Attorney.

Patented Mar. 17, 1942

2,276,825

UNITED STATES PATENT OFFICE 2,276,825

ADJUSTABLE NOZZLE EXTENSION FOR ARC WELDING HEADS

Verni J. Chapman, Schenectady, N. Y., assignor to General Electric Company, a corporation of New York Application October 16, 1941, Serial No. 415,227

6 Claims. (Cl. 219—8)

My invention relates to arc welding apparatus and more particularly to an adjustable nozzle extension for arc welding heads.

To accommodate various sizes of work it is frequently desirable to adjust the location of the arcing terminal of an electrode without disturbing the major parts of the welding machine employed for feeding the electrode. This adjustment may be accomplished by adjusting the electrode nozzle relatively to the arc welding head employed for feeding the electrode.

Arrangements have heretofore been proposed in which the electrode fed by an arc welding head is supplied through a flexible conduit to the electrode nozzle so that the electrode nozzle may be adjusted relatively to the arc welding head to locate the arcing terminal of the electrode in a desired position without requiring a relocation of the welding head. Adjustments of such arrangements however result in a buckling or folding of the flexible conduit which greatly impedes the passage of an electrode therethrough so that the electrode feeding means of the welding head is overloaded or slippage occurs between the electrode and its feeding means causing faulty operation of the welding head.

It is an object of my invention to provide for arc welding heads an adjustable nozzle extension whose effective length may be changed without causing the electrode to buckle in its passage from the electrode feeding means of the welding head to the nozzle which positions its arcing terminal relatively to the work.

It is also an object of my invention to provide for arc welding heads an adjustable nozzle extension which may be employed to direct the electrode laterally of its electrode feeding means for reaching points of welding which otherwise might be inaccessible without adjusting the position of the welding head.

It is a further object of my invention to provide an arc welding head embodying such an adjustable nozzle extension.

Further objects of my invention will become apparent from a consideration of the embodiments thereof illustrated in the accompanying drawing.

In this drawing Fig. 1 is a front view of an automatic arc welding head embodying my adjustable nozzle extension, Fig. 2 is a corresponding view of the nozzle extension illustrating an adjustment of parts for decreasing its effective length, and Fig. 3 is a plan view of the nozzle extension illustrating its adjustment for directing an electrode laterally of the electrode feeding means of the welding head.

The adjustable nozzle extension illustrated in the accompanying drawing comprises a rod mounted for lengthwise and rotary movement relative to the electrode feeding means of a welding head so that an electrode nozzle attached to one end thereof may be adjusted toward, away from, and laterally of the electrode feeding means. One or more electrode guides spaced from one another, the electrode nozzle, and the electrode feeding means are mounted for movement around and along this rod. These electrode guides may be releasably clamped to the rod for any desired spacing or angular position relative to one another, and the rod may be releasably clamped in a support attached to the welding head to secure a desired spacing or lateral displacement of the electrode nozzle from the electrode feeding means.

As shown in Fig. 1 of the drawing the adjustable nozzle extension comprises a cylindrical rod 10 mounted for lengthwise and rotary movement in a support 11 which is attached to the welding head 12 by fastening means such as bolts 13. Preferably support 11 is electrically insulated from the welding head and bolts 13 by a fiber strip 14 and insulating bushings and washers not shown. The washers 15 shown in the drawing are metallic washers interposed between the bolt heads and the assembly completed by these bolts.

The welding head illustrated in the drawing has the construction described and claimed in United States Letters Patent 2,170,673 of Jasper E. Anderson, granted August 22, 1939 and assigned to the assignee of my present invention. In this welding head the electrode feeding means comprises rolls 16 which engage and feed a welding electrode 17 through guides 18 and 19 forming part of the welding head. The support 11 for rod 10 is mounted on a welding head boss which also serves as a support for guide 19. The welding head as a unit is supported on an arm 20 having a flanged portion 21 for attachment to a member of the machine structure of which it forms a part.

Electrode 17 is fed through one or more guiding means 22 which are spaced from one another, the feeding means 16 and an electrode nozzle 23 along rod 10. This electrode nozzle may be of any suitable type and is employed for positioning the arcing terminal of the electrode and supplying welding current thereto. As shown in the drawing it has the construction described and claimed in my United States Letters Patent 1,959,194 granted May 15, 1934 and assigned to the assignee of my present invention.

Nozzle 23 is held between the jaws of an arm 24 by means of a bolt 25. This arm is attached to the lower end of rod 10 and is of sufficient length to position the electrode passageway through nozzle 23 in registry with the electrode passageway in guide 19 of the welding head when the parts are assembled as illustrated in Fig. 1. The electrode passageways in guides 22 are also aligned with the passageways through guide 19 and nozzle 23.

As previously pointed out rod 10 is mounted for lengthwise movement in its support 11. It may be releasably clamped in this support by a screw 26 to secure a desired positioning of nozzle 23 relative to the welding head or electrode feeding means thereof. Electrode guides 22 are slidably and rotatably mounted on rod 10 and are held in adjusted positions thereon by clamping screws 27. The clamping screws 26 and 27 may engage a flat surface portion of rod 10, such as 28, so that upon tightening them the electrode passageways in the guides and nozzle are aligned with one another and the passageways through guide 19 of the welding head.

The effective length of the nozzle extension may be adjusted by releasing these clamping screws, sliding rod 10 through its support 11 to position nozzle 23 at the desired distance from the welding head, and then tightening clamping screw 26. Thereafter electrode guides 22 are spaced along rod 10 and clamping screws 27 are tightened to hold these guides in desired positions on this rod. Such an adjustment for decreasing the effective length of the nozzle extension is shown in Fig. 2. The electrode guides are sufficient in number to prevent buckling of the electrode in its passage from the welding head to the electrode nozzle. In the arrangement illustrated three such guides have been employed.

Welding current is supplied to nozzle 23 by connecting the terminal 29 of a welding current cable against the front surface of support 11 through the agency of one of the bolts 13 by which this support is attached to the welding head. Rod 10 is adapted to make a current conducting engagement with its support 11 and since nozzle 23 is directly attached to rod 10 through the agency of arm 24, welding current flows from terminal 29 of the welding cable through support 11, rod 10, arm 24 and nozzle 23 to electrode 17 near its arcing terminal.

Rod 10 may be rotated in its support 11 and guides 22 may be rotated about rod 10 as pointed out above. Consequently it is possible to displace nozzle 23 laterally of the electrode feeding means 16 to direct the electrode to points of welding which might otherwise be inaccessible without adjusting the position of the welding head. To facilitate this adjustment flat portion 28 of rod 10 may be omitted.

Fig. 3 is a plan view of my nozzle extension showing an adjustment in which arm 24 has been swung through 180° to provide a maximum lateral displacement of the arcing terminal of the electrode. Guides 22 have each been swung about rod 10 so that they are angularly spaced from one another by equal amounts to guide the electrode in its passage from the welding head to nozzle 23. Other adjustments between that illustrated in Fig. 1 and that illustrated in Fig. 2 are of course apparent.

The adjustable nozzle extension is in the nature of an attachment which may be applied to any arc welding head. It need not of necessity embody the particular construction illustrated, since other arrangements will occur to those skilled in the art. For example, nozzle 23 and guides 22 may be independently supported and means may be provided for moving them simultaneously toward and away from one another by amounts that results in a desired spacing of these members relative to one another when nozzle 23 is moved toward and from the welding head to adjust its spacing therefrom.

Various other arrangements and modifications will occur to those skilled in the art and I consequently intend in the appended claims to cover all such modifications and variations as fall within the true spirit and scope of my invention.

What I claim as new and desire to secure by Letters Patent of the United States is:

1. An arc welding head comprising electrode feeding means, means for supplying welding current to an electrode fed by said feeding means, means for adjusting and holding the spacing of said welding current supplying means and said feeding means, electrode guiding means spaced from said welding current supplying means and said feeding means, and means for adjusting and holding the spacing of said guiding means relative to said welding current supplying means and said feeding means.

2. An arc welding head comprising electrode feeding means, a support, a rod mounted for lengthwise movement in said support so that an end portion of said rod may be adjustably spaced from said feeding means, means for releasably clamping said rod in said support, an electrode nozzle attached to said end portion of said rod, an electrode guide spaced from said nozzle and said feeding means and mounted for movement along said rod, and means for releasably clamping said guide to said rod.

3. An arc welding head comprising electrode feeding means, a support, a rod mounted for rotary and lengthwise movement in said support so that said rod may be rotated and an end portion thereof adjustably spaced from said feeding means, means for releasably clamping said rod in said support, an electrode nozzle attached to said end portion of said rod, an electrode guide spaced from said nozzle and said feeding means and mounted for movement along and around said rod, and means for releasably clamping said guide to said rod.

4. An arc welding head comprising electrode feeding means, a current conducting support, means for electrically insulating said support from said feeding means, a current conducting rod mounted for lengthwise movement in said support and adapted to make a current conducting engagement therewith, means for releasably clamping said rod in said support, an electrode nozzle attached by a current conducting connection to said rod, means for supplying welding current to said support and thereby through said rod to said nozzle, an electrode guide spaced from said support and said nozzle and mounted on said rod for movement lengthwise thereof, and means for releasably clamping said guide to said rod.

5. An adjustable nozzle extension for arc welding heads comprising a support, a rod mounted for lengthwise movement in said support, means for releasably clamping said rod in said support, an electrode nozzle attached to said rod, an electrode guide spaced from said support and said nozzle and mounted on said rod for movement lengthwise thereof, and means for releasably clamping said guide to said rod.

6. An adjustable nozzle extension for arc welding heads comprising a support, a rod mounted for rotary and lengthwise movement in said support, means for releasably clamping said rod in said support, an electrode nozzle attached to said rod, an electrode guide spaced from said support and said nozzle and mounted on said rod for movement around and lengthwise thereof, and means for releasably clamping said guide to said rod.

VERNI J. CHAPMAN.